United States Patent

Zelesky et al.

[11] Patent Number: 5,857,837
[45] Date of Patent: Jan. 12, 1999

[54] COOLABLE AIR FOIL FOR A GAS TURBINE ENGINE

[75] Inventors: Mark F. Zelesky, Coventry; Dominic J. Mongillo, New Britain; David J. Candelori, Glastonbury, all of Conn.; Gary D. Steuber, Loveland, Ohio

[73] Assignee: United Technologies Corporation, Hartford, Conn.

[21] Appl. No.: 883,522

[22] Filed: Jun. 26, 1997

Related U.S. Application Data

[60] Provisional application No. 60/020,837 Jun. 28, 1996.

[51] Int. Cl.⁶ .................................................. F01D 5/18
[52] U.S. Cl. ........................................ 416/97 R; 415/115
[58] Field of Search .................... 415/115, 116; 416/96 R, 96 A, 97 R

[56] References Cited

U.S. PATENT DOCUMENTS

| | | |
|---|---|---|
| 4,775,296 | 10/1988 | Schwarzmann et al. ............. 416/97 R |
| 4,820,123 | 4/1989 | Hall . |
| 5,122,033 | 6/1992 | Paul . |
| 5,403,159 | 4/1995 | Green et al. . |
| 5,488,825 | 2/1996 | Davis et al. ......................... 416/97 R |

FOREIGN PATENT DOCUMENTS

| | | | |
|---|---|---|---|
| 61-1804 | 1/1986 | Japan ................................. 416/97 R |
| 86/02406 | 4/1986 | WIPO . |

OTHER PUBLICATIONS

International Search Report of International Application No. PCT/US97/11565, 3 pgs., dated Nov. 5, 1997.

*Primary Examiner*—Christopher Verdier
*Attorney, Agent, or Firm*—John Swiatocha

[57] ABSTRACT

A coolable airfoil (25) for a gas turbine engine includes a leading edge portion (52) cooled by a combination of radial and impingement flows through internal passages (80) and (90) separated by an internal wall (95) which is imperforate along a radially inner portion (100) thereof and apertured along a radially outer portion (105) thereof

12 Claims, 2 Drawing Sheets

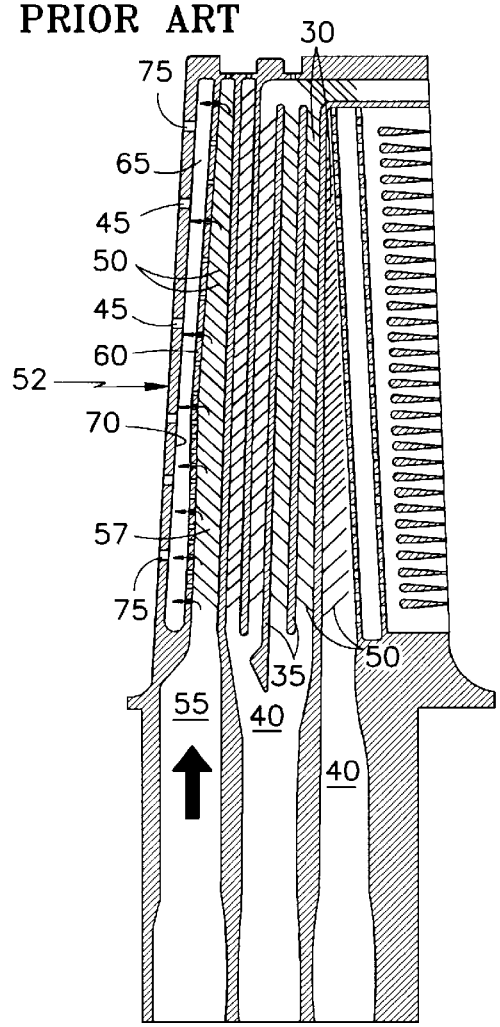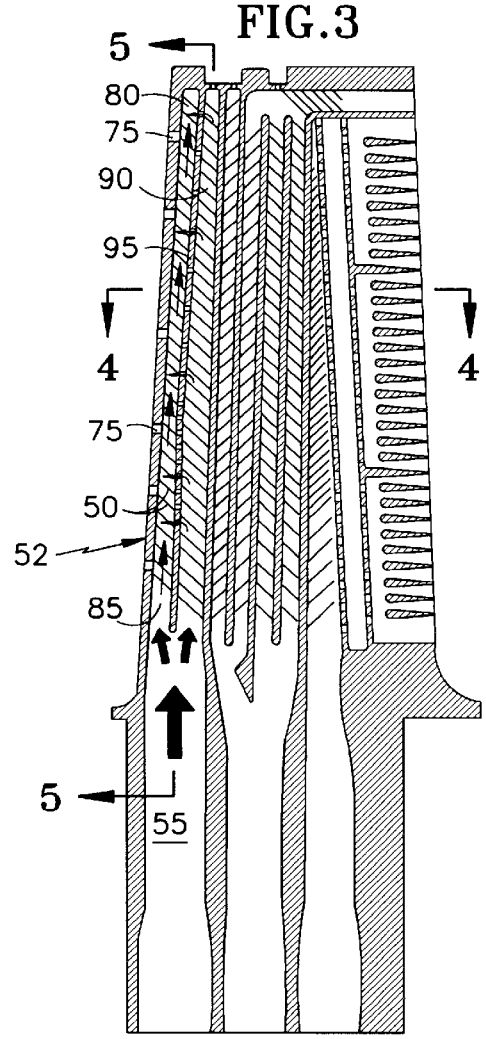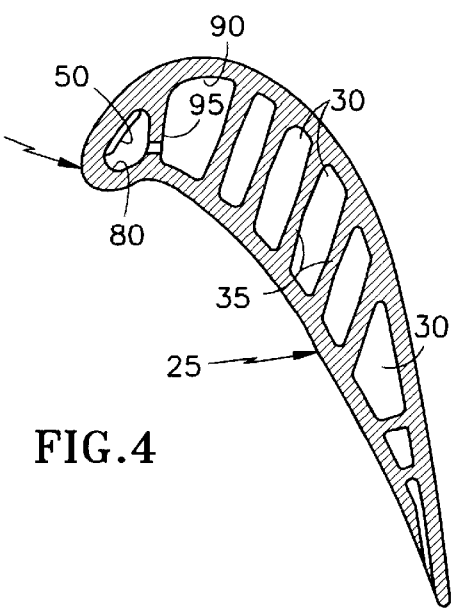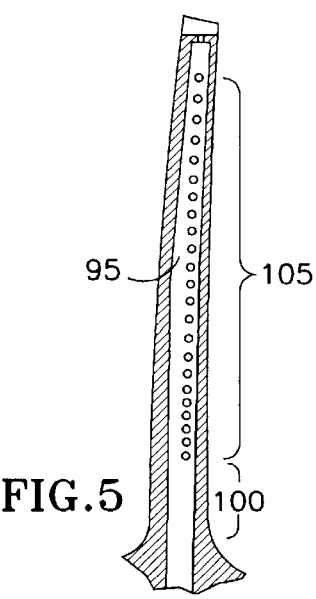

COOLABLE AIR FOIL FOR A GAS TURBINE ENGINE

CROSS REFERENCE TO RELATED APPLICATIONS

This application claims the benefit of U.S. Provisional Application No. 60/020,837, entitled COOLABLE AIRFOIL FOR A GAS TURBINE ENGINE and filed Jun. 28, 1996.

BACKGROUND OF THE INVENTION

1. Technical Field

This invention relates to coolable airfoils of the type used in high temperature rotary machines such as gas turbine engines and more particularly, to an improved scheme for cooling the leading edge portion of such airfoils, with enhanced efficiency.

2. Background Art

Gas turbine engines for powering aircraft, watercraft or for industrial use include a compressor, a combustor and a turbine. Air drawn into the engine is compressed in the compressor causing the temperature and pressure of the air to rise. The compressed air is mixed with fuel in the combustor and the mixture is burned. The products of combustion are expanded in the turbine section to provide useful work in powering the turbine (and in turn the compressor to which the turbine is mechanically connected) as well as thrust.

The turbine typically comprises a series of rotatable disks having a plurality of blades extending radially outwardly therefrom. The blades receive energy from the hot products of combustion and in reaction thereto, cause the disks to which they are attached, to rotate. The products of combustion at temperatures in the range of 2500° F.–3000° F., are capable of damaging the turbine blades unless the blades are cooled interiorly thereof with the cooling fluid such as air bled from the compressor.

As is well known, modem turbine blades are provided with internal passages through which cooling air is channeled and then expelled, typically along the airfoil surfaces of the blades. Typical of the cooling passage arrangements employed in modern turbine blades is that found in U.S. Pat. No. 5,403,159 to Green et al. entitled "Coolable Airfoil Structure" and assigned to the assignee of the present invention. Perhaps the most difficult portions of turbine blades to cool are the leading edges thereof, particularly the leading edges of the high pressure turbine blades which encounter the products of combustion directly from the combustor. Prior schemes to cool the interior of turbine blades at the leading edges thereof involved channeling cooling air radially outwardly through the blades, immediately adjacent to an inner surface of the leading edge of the blade. Subsequently, it was learned that a more effective cooling of the blade leading edges could be achieved by impinging cooling air against the inner surface of the leading edge of the blade from an adjacent cooling passage. Although effective, such a cooling scheme does not necessarily make the most efficient use of the cooling air, which, as set forth hereinabove, is typically bled from the compressor of the engine. It will be appreciated that the more air bled off of the compressor for cooling, the less air is available to support combustion, thereby adversely affecting the efficiency of the engine. Optimizing the efficiency of turbine blade, leading edge cooling schemes optimizes the efficiency of the engine into and therefore reduces the amount of fuel burned by the engine, thus enhancing the economy of operation of the engine.

DISCLOSURE OF INVENTION

It is therefor an object of the present invention to provide a cooling scheme of enhanced thermal efficiency for cooling the leading edges of turbine blades in gas turbine engines, with minimal cooling air supply pressure for enhanced turbine efficiency.

In accordance with the present invention, the leading edge of a gas turbine engine turbine blade is cooled by a combination of radial and impingement flows such that a minimal, substantially uniform pressure drop is maintained across the leading edge along a major portion of the span thereof. This results in reduced cooling air leakage from the platform/seal area of the interior of the blade and into the gas path, improved internal heat transfer characteristics, and thus, more efficient use of compressor bleed air for the cooling of the leading edge.

In the preferred embodiment, the radially inner portion of the leading edge is cooled by radial flow through a first cooling passage adjacent to the interior surface of the leading edge. The leading edge is cooled along a radially medial portion thereof by combined radial and impingement flows through the first passage. The radially outermost portion of the leading edge is cooled by essentially impingement flow only.

Both the radial flow along, and the impingement flow against, the inner surface of the leading edge are provided through the first radial cooling passage which is separated from a second radial cooling passage by a nonuniformly apertured wall. The radial innermost portion of the wall is imperforate to accommodate a radially outer flow along the radially innermost portion of the leading edges' inner surface. A radially medial portion of the wall is apertured to permit flow from the second passage into the first passage, against a medial portion of the inner surface for impingement cooling thereof in addition to the radial flow cooling thereof The first passage is provided with a flow resister in at least a radially outer portion of the first passage, such as a linear array of skewed trip strips, which can extend along substantially the entire length of the first passage essentially to enhance convective heat transfer and stagnate the radial flow at the radially outermost portion of the first passage, whereby cooling flow from the second passage into the first passage through the nonuniformly apertured wall, cools the radially outermost portion of the interior surface of the leading edge by essentially impingement flow only.

BRIEF DESCRIPTION OF THE DRAWINGS

FIG. 2 is a sectioned elevation of a turbine blade having an airfoil portion with a prior art leading edge cooling scheme.

FIG. 3 is a sectioned elevation of the coolable airfoil of the present invention.

FIG. 4 is a sectioned plan view of the airfoil of the present invention taken along line 4—4 of FIG. 3.

FIG. 5 is an elevation taken in the direction of line 5—5 of FIG. 3 showing an interior cooling passage wall of the airfoil of the present invention.

BEST MODE FOR CARRYING OUT THE INVENTION

Figure 1:
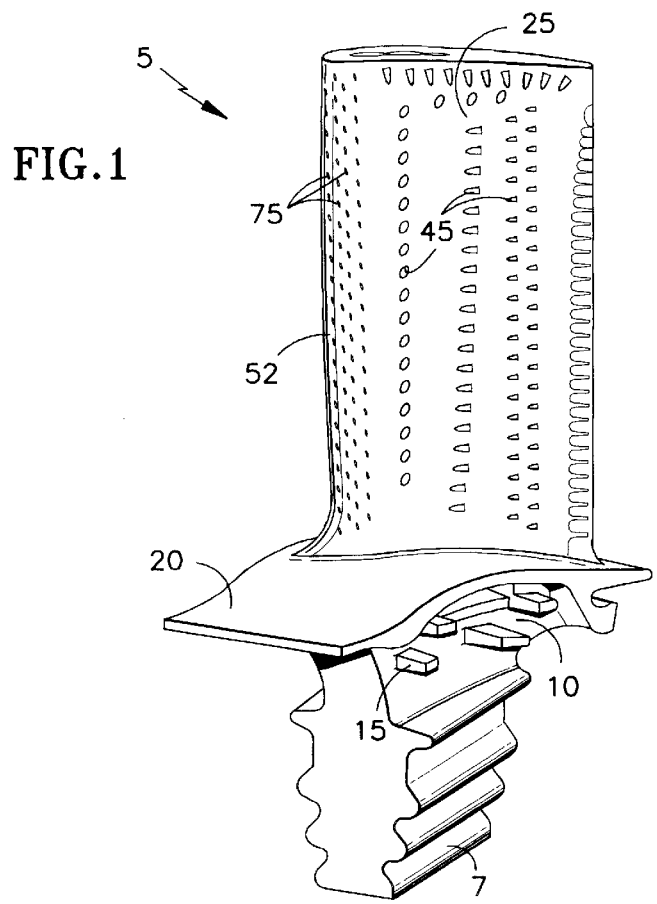
FIG. 1 is a perspective view of a turbine blade for a gas turbine engine, of the type employing the coolable airfoil of the present invention.

Referring to FIG. 1, a turbine blade 5 for a gas turbine engine, employing a coolable airfoil such as that described herein comprises, from a radially innermost end, thereof a dove-tail or fur tree-shaped root 7 adapted to be received in a mating slot in a turbine rotor disk (not shown) to which the blade is attached. The root terminates in a reduced thickness neck 10 having various detents or lugs 15 extending therefrom which position and restrain various vibration dampers and seals (also not shown) associated with the blade. The reduced thickness neck portion is bounded by a platform 20 which defines the radially innermost wall of the flow passage through which the products of combustion from the combustor flow to the turbine blades. The products of combustion impact the airfoil portion 25 of the blade in a manner well known in the art, providing aerodynamic forces on the blade which rotate the turbine disk.

Referring to FIG. 2, a prior art gas turbine engine blade is provided in the interior thereof with various cooling passages 30 which are cast in the blade during the manufacture thereof, passages 30 being defined and bounded by various radially extending interior walls 35. In a manner well known in the art, cooling air such as compressor bleed air is provided to the interior of the blade through radially extending supply passages 40 in the blade root. The cooling air flows through the various internal passages 30 picking up heat from the blade and discharging the heat with the spent cooling air through various passages 45 through the walls of the airfoil portion of the blade (See also FIG. 1.). A number of trip strips (ridges) 50 in the walls of cooling passages 30 lend turbulence to the flow of cooling air through the blade for enhanced heat transfer therein.

The leading edge 52 of the blade shown in FIG. 2 is cooled by an impingement flow of cooling air provided through passage 55, supply cooling passage 57, through apertures in internal wall 60, laterally through smooth walled impingement chamber 65, and into impingement with the inner surface 70 of the airfoil leading edge. The cooling air is then exhausted from the impingement chamber through apertures 75 in the leading edge wall, to provide film cooling to the outer surface of the leading edge.

While the leading edge cooling scheme illustrated in FIG. 2 has proven generally adequate for certain current applications, it is always desirable to reduce the amount of compressor bleed air required for turbine blade cooling so as not to compromise the efficiency and therefore cost of operation of the engine. Moreover, as modern gas turbine engines increase in thrust output, greater quantities of air are required to support combustion and thus are unavailable with any measure of efficiency, to provide turbine blade cooling. In the cooling scheme shown in FIG. 2, the cooling air pressure in chamber 65 and passage 57 must be maintained at such an elevated level that cooling air leakage inwardly, past various seals associated with the blade (not shown), and into the gas path, is likely. In accordance with the present invention, as illustrated in FIG. 3, an improved cooling scheme for the leading edge of the airfoil portion of the turbine blade is shown. In FIG. 3, the smooth impingement chamber shown in FIG. 2 has been replaced by a first cooling passage 80 open at the radially innermost end 85 thereof and provided with a linear array of skewed trip strips. First passage 80 is supplied with cooling air from main supply passage 55 which also supplies cooling air to an adjacent (second) cooling passage 90. First and second cooling passages 80 and 90 are separated from each other and thus defined in part by internal wall 95 which, like interior walls 35 discussed with respect to the prior art blade in FIG. 2, is cast into the interior of the blade during the manufacture of the blade. As perhaps best seen in FIG. 5, wall 95 is imperforate along a radially inner portion thereof 100 comprising about 15% to 25% of the blade span and apertured along a radially outer portion thereof 105 comprising about 75% to 85% of the blade span. As is also best illustrated in FIG. 5, the apertures in radially outermost portion 105 are increasingly spaced apart in a radially outward direction.

In operation, cooling air supplied through main supply passage 55 is split by the radially innermost end of wall 95, some of the cooling air flowing radially outwardly through the second passage 90 and the remainder flowing radially outwardly through first cooling passage 80. This radial flow through passage 80 cools the radially innermost portion of the leading edge by removing heat from the inner surface thereof and expelling the heat by the discharge of the cooling air through apertures 75 in the leading edge wall. As the cooling air continues to flow radially outwardly through first passage 80, it continues to convectively cool the leading edge by means of the radial flow along the inner surface thereof. Additionally, cooling air flowing through second passage 90 is channeled through the apertures in wall 95 into first passage 80 and into impingement with the inner surface of the leading edge. Thus, it will be appreciated that the radially medial portion of the leading edge is cooled by a combination of radial flow through first passage 80 and impingement against the inner surface of the leading edge. As the cooling air continues to flow outwardly through first passage 80, the trip strips therein tend to slow the flow at the radially outermost end of the passage into essentially a stagnant condition whereby the outer portion of the leading edge is no longer convectively cooled by radial flow through the first passage. However, the apertures in the radially outer portion of wall 95 continue to conduct cooling air from the second passage 90 into impingement contact with the inner surface of the leading edge such that the radially outermost portion thereof is cooled essentially by impingement cooling alone.

Figure 6:
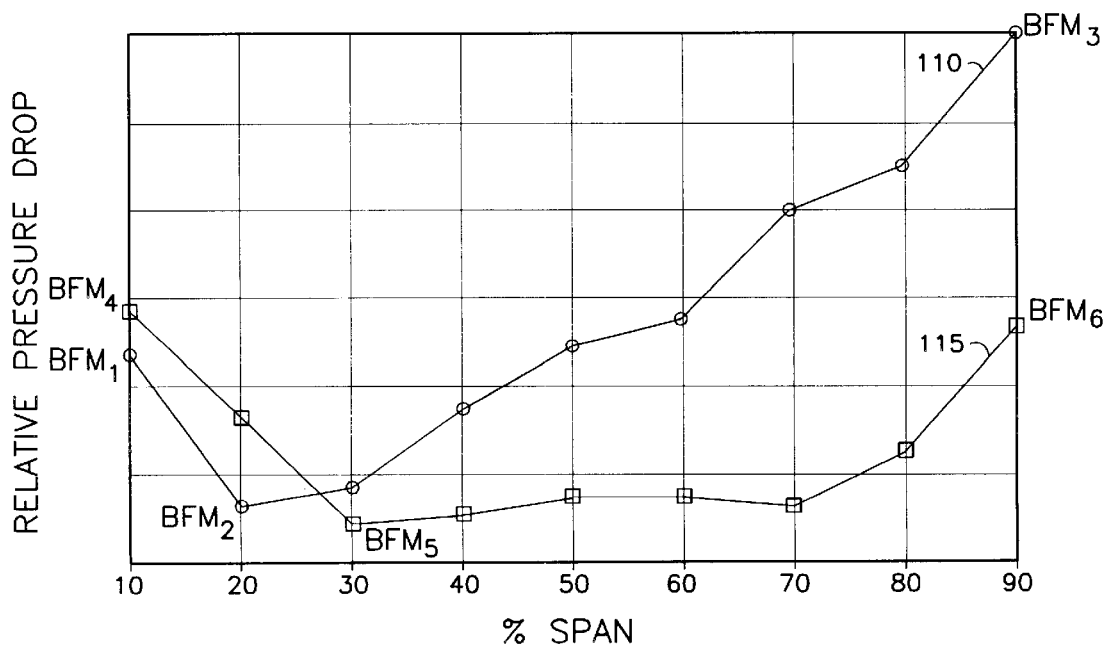
FIG. 6 is a plot of the relative pressure drop across the leading edge and along the span of both a prior art cooled airfoil and the coolable airfoil of the present invention.

The benefits of the cooling scheme is illustrated and described herein are perhaps best understood in connection with FIG. 6. Referring to FIG. 6, curve 110 illustrates the backflow margin (pressure drop) across the leading edge wall, between ambient adjacent to the leading edge, and impingement chamber 65 of the prior art airfoil illustrated in FIG. 2, throughout the span of the airfoil. As shown, at a radially inner portion of the leading edge, the backflow margin is at a relatively modest magnitude $BFM_1$. Progressing radially outwardly over the first third of the airfoil span, the backflow margin decreases to a second lower magnitude $BFM_2$ which has been determined to correspond to effective and efficient leading edge cooling. However, from the one third span location outwardly to the outermost portion of the airfoil, the backflow margin increases at a relatively high rate to a third maximum value $BFM_3$. It has been determined that a progressive increase in backflow margin along the span of the blade is indicative of a less than optimal (efficient) use of cooling air to cool the leading edge. Rather, it has been determined that maintaining a relatively constant backflow margin along the span of the blade is characteristic of a much more efficient leading edge cooling with much lower volumes of cooling (compressor bleed) air. Referring to curve 115 in FIG. 6, it is seen that with the cooling scheme of the present invention, at the radially innermost end of the airfoil, the backflow margin has a magnitude of $BFM_4$ which is slightly higher than $BFM_1$. Somewhat like the prior art cooling scheme illustrated in FIG. 2, with the present invention, the backflow margin decreases to a modest (more nearly optimal) value $BFM_5$. However, unlike the prior art, with the present invention, the backflow margin remains relatively steady throughout the remainder of the airfoil span, peaking at a backflow margin $BFM_6$ which, while somewhat higher than $BFM_5$ is still far lower than the prior art radially outermost backflow margin $BFM_3$. This much more constant backflow margin along the span of the airfoil is indicative of a much more effective leading edge cooling with significantly less compressor bleed air in the cooling scheme of the present invention.

By maintaining a relatively constant backflow margin across the leading edge of the airfoil, the leading edge is cooled with much less cooling energy (lower cooling air pressures) in the interior of the leading edge than in the prior art. In other words, overall cooling passage pressurization is reduced whereby more compressor bleed airflow energy is available for the production of thrust. Since the overall cooling passage pressurization is reduced, cooling air leakage from the cooling channels in the platform area, radially inwardly past the various seals employed with the blade is significantly reduced. The enhanced cooling afforded by modem day impingement flow techniques is preserved while the combination of radially convergent cooling and the turbulence afforded by the trip strips in the first cooling passage further enhance the impingement cooling without requiring extreme cooling air pressurization of the system.

While the coolable airfoil of the present invention has been described within the context of a turbine blade, it would be appreciated that the invention may be employed with equal utility in a stationary turbine vane. Accordingly, it is intended by the following claims to cover such equivalent expressions of the present invention as well as various modifications and alternate embodiments thereof as may suggest themselves to those skilled in the art.

Having thus described the invention what is claimed is:

1. A coolable airfoil for a gas turbine engine, said airfoil having a leading edge portion, said airfoil further including an internal wall defining, with an inner surface of said leading edge portion, a first cooling gas passage, said internal wall further defining in part, a second cooling gas passage generally parallel and adjacent to said first cooling gas passage, said airfoil being characterized by:

said first and second cooling gas passages being supplied with cooling gas from radially inner ends thereof;

said internal wall being perforated along a first portion thereof to accommodate cooling gas flow from said second passage through said perforations, to said first passage for impingement cooling of said inner surface of said leading edge portion; and said internal wall being imperforate along a second portion thereof, whereby a corresponding portion of said leading edge inner surface is cooled by radial flow of cooling gas through said first passage.

2. The airfoil of claim 1 characterized by:

said first portion of said internal wall being a radially outer portion thereof;

said second portion of said internal wall being a radially inner portion thereof; and said first passage including a flow resistor along a substantial portion of the length thereof to maintain a desired profile of pressure difference between said first and second passages and between said first passage and ambient.

3. The airfoil of claim 1 characterized by said radially outer portion of said internal wall comprising approximately seventy-five to eighty-five percent of the span thereof.

4. The airfoil of claim 3 characterized by said radially inner portion of said internal wall comprising approximately fifteen to twenty-five percent of the span thereof.

5. The airfoil of claim 1 characterized by said perforated portion of said internal wall being sized to permit radial flow through a radially medial portion of said first passage, whereby a corresponding radially medial portion of said leading edge is cooled by radial flow in addition to said impingement flow.

6. The airfoil of claim 5 characterized by said perforated portion of said internal wall comprising a linear array of spaced holes, the spacing between which increases in a radially outer direction.

7. A coolable airfoil for a gas turbine engine, said airfoil having a leading edge portion, said airfoil further including an internal wall defining, with an inner surface of said leading edge portion, a first cooling gas passage, said internal wall further defining in part, a second cooling gas passage generally parallel and adjacent to said first cooling gas passage, said airfoil being characterized by:

said first and second cooling gas passages being supplied with cooling gas from radially inner ends thereof;

said internal wall being imperforate along a radially inner portion thereof, whereby a radially inner portion of said leading edge portion is cooled only by radial outer flow through said first passage;

said internal wall being perforated along a radially outer portion thereof, whereby a radially medial portion of said leading edge is cooled by a combination of radial flow through said first passage, and impingement flow of cooling gas against an inner surface of said leading edge portion from said second passage, through said perforations in said internal wall and;

a flow resistance disposed in at least a radially outer portion of said first passage to stagnate radial coolant gas flow therein, whereby a radially outer portion of said leading edge is cooled only by impingement flow of cooling gas against an inner surface of said leading edge from said second passage, through said perforations in said internal wall.

8. The airfoil of claim 7 further characterized by said radially inner portion of said first passage generally comprising approximately fifteen to twenty-five percent of the entire span of said airfoil.

9. The airfoil of claim 7 characterized by said flow resistance comprising a linear array of trip strips.

10. The airfoil of claim 9 characterized by said linear array of trip strips extending along substantially the entire length of said first passage.

11. The airfoil of claim 7 characterized by said radially outer portion of said leading edge comprising approximately seventy-five to eighty-five percent of the entire span thereof.

12. The airfoil of claim 7 characterized by said perforated portion of said internal wall comprising a linear array of holes, the spacing between which increases in a radially outer direction.

* * * * *